T. E. MURRAY, Jr.
METHOD OF AND APPARATUS FOR ELECTRICALLY MAKING OPENINGS IN METAL PLATES.
APPLICATION FILED JULY 13, 1917.

1,242,581.

Patented Oct. 9, 1917.

INVENTOR
Thomas E. Murray Jr.
BY
ATTORNEY

UNITED STATES PATENT OFFICE.

THOMAS E. MURRAY, JR., OF BROOKLYN, NEW YORK.

METHOD OF AND APPARATUS FOR ELECTRICALLY MAKING OPENINGS IN METAL PLATES.

1,242,581.  Specification of Letters Patent.  Patented Oct. 9, 1917.

Application filed July 13, 1917. Serial No. 180,286.

*To all whom it may concern:*

Be it known that I, THOMAS E. MURRAY, Jr., a citizen of the United States, residing at Brooklyn, in the county of Kings and State of New York, have invented a certain new and useful Improvement in Methods of and Apparatus for Electrically Making Openings in Metal Plates, of which the following is a specification.

The invention is a method of and apparatus for electrically making an opening in a metal plate, without fusing the metal of said plate over the whole area of said opening. To this end, I subject an annular portion of said plate to heating by an electric current of sufficient strength to fuse only said annular portion, the metal core or portion of the plate surrounded thereby being thus freed from the remainder of the plate. In this way, I economize in the current required to produce the desired opening because of the comparatively small amount of metal to be melted, and I preserve the resulting detached core in what may be a utilizable shape—as, for example, as here shown, in disk form.

In the accompanying drawings—

Figure 1:
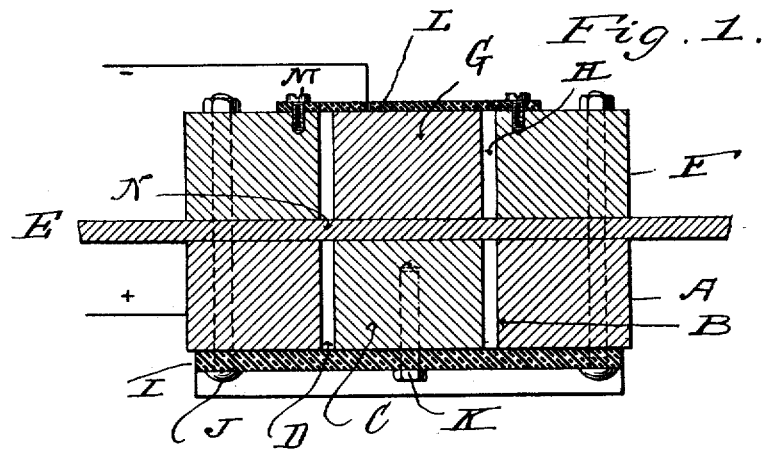
Figure 2:
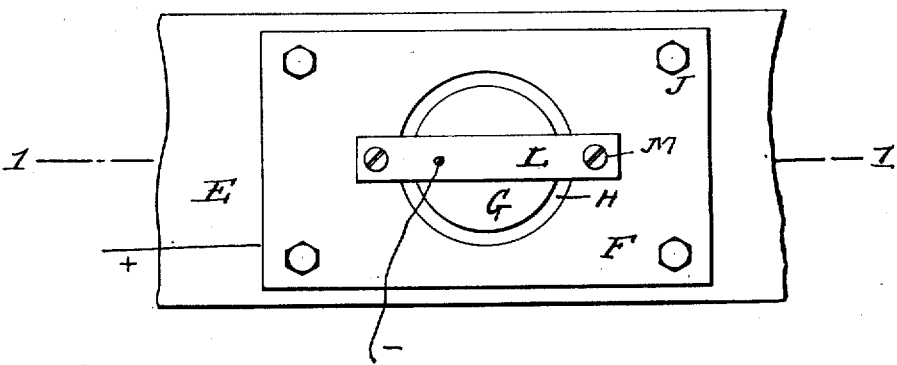

Figure 1 is a vertical section of my apparatus on the line 1, 1 of Fig. 2. Fig. 2 is a plan view.

Similar letters of reference indicate like parts.

A is a metal block, having a circular opening B. C is a cylindrical metal block of less area than opening B and disposed therein, so that an annular interval or gap D surrounds said block C. The metal plate E, in which an opening is to be made, is placed upon the blocks A and C so as to cover said gap D. Upon plate E is disposed a metal block F, having an opening similar to opening B, and a cylindrical block G, similar to block C, so that an annular interval or gap H is produced between blocks F and G which registers with gap D.

The blocks A and F may be secured together and to an insulating support I by bolts J. The cylindrical block C may be secured on said support by a pin K. The cylindrical block G may be held in place by a bar L of insulating material fastened to block F by screws M. The means for holding the blocks in place, as described, is not essential, since obviously other means may be used.

One terminal of a circuit may be connected to block F, and the opposite terminal to block G. The blocks A and F, electrically connected through plate E, will, therefore, form one electrode, and the blocks C and G, also electrically connected through said plate, will form the opposite terminal. The circuit will then be completed by the annular portion N of plate E which bridges the gaps D and H. The current is to be of such strength as that said annular portion of plate E will become heated and melted sufficiently to flow down into gap D, producing an annular slot in plate E, and so freeing the circular portion of said plate which lies between blocks C and G from the remainder of said plate. In this way, I produce a circular opening in plate E corresponding in area to the openings in blocks A and F.

The disk or core of metal remaining between blocks C and G may be used for any desired purpose.

While I have here shown my invention as applied to the making of a circular opening in the plate, and a circular disk, it will be obvious that I may vary the configuration of said opening by correspondingly varying the configuration of the blocks C and G and the openings in blocks A and F.

I claim:

1. The method of making an opening of selected configuration through a metal plate, which consists in disposing said plate upon electrodes having an annular gap or interval between them, and melting the portion of the plate bridging said gap, whereby the portion of the plate surrounded by said gap is released from the remainder of said plate.

2. The method of separating from a metal plate a portion thereof of selected configuration, which consists in electrically fusing a narrow annular strip of said plate surrounding the portion to be separated, and thereby separating said portion from the remainder of said plate.

3. An apparatus for electrically making an opening through a metal plate, comprising an electrode having an opening, and an electrode of less area disposed within said opening so that an annular gap or interval is produced between said electrodes, the said plate being in contact with said electrodes and covering said gap.

4. An apparatus for electrically making an opening through a metal plate, comprising an electrode formed in two parts receiving the plate between them and having registering openings, and a second electrode formed in two parts receiving the plate between them, the said parts being respectively disposed in the openings of said first-named parts, the parts of the second electrode being of less area than the parts of the first electrode so that annular gaps are formed between said electrodes and respectively on opposite sides of said plate.

In testimony whereof I have affixed my signature in presence of two witnesses.

THOMAS E. MURRAY, Jr.

Witnesses:
GERTRUDE T. PORTER,
MAY T. McGARRY.